United States Patent
Xu et al.

(10) Patent No.: US 11,778,551 B2
(45) Date of Patent: Oct. 3, 2023

(54) RADIO FREQUENCY ENERGY HARVESTING INDICATION SIGNAL

(71) Applicant: QUALCOMM Incorporated, San Diego, CA (US)

(72) Inventors: Huilin Xu, Temecula, CA (US); Yongjun Kwak, San Diego, CA (US); Yuchul Kim, San Diego, CA (US); Jing Lei, San Diego, CA (US); Hwan Joon Kwon, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 17/211,673

(22) Filed: Mar. 24, 2021

(65) Prior Publication Data

US 2022/0312315 A1 Sep. 29, 2022

(51) Int. Cl.
*H04W 52/02* (2009.01)
*H04W 68/00* (2009.01)

(52) U.S. Cl.
CPC ... *H04W 52/0216* (2013.01); *H04W 52/0235* (2013.01); *H04W 68/005* (2013.01)

(58) Field of Classification Search
None
See application file for complete search history.

(56) References Cited

U.S. PATENT DOCUMENTS 9,477,292 B1 * 10/2016 Murali .............. H04W 52/0235
10,383,126 B2 * 8/2019 Gollakota .............. H04L 12/10
2009/0238559 A1 * 9/2009 Pfeiffer .............. H04Q 11/0067
  398/58
2010/0279715 A1 * 11/2010 Alanara ................ H04W 68/02
  455/458
2013/0142136 A1 * 6/2013 Pi ...................... H04W 28/0289
  370/329
2014/0248915 A1   9/2014 Chandramouli et al.
2014/0254445 A1 * 9/2014 Heinzelman ...... H04W 52/0229
  370/311

(Continued)

FOREIGN PATENT DOCUMENTS

EP          3448091 A1 *  2/2019  .......... H04W 28/065
WO    WO-2016071686 A1 *  5/2016  .............. H02J 50/20

(Continued)

OTHER PUBLICATIONS

International Search Report and Written Opinion—PCT/US2022/070346—ISA/EPO—dated Apr. 20, 2022.

*Primary Examiner* — Jamaal Henson
(74) *Attorney, Agent, or Firm* — Changwoo Yang

(57) ABSTRACT

This disclosure provides methods, devices and systems for harvesting radio frequency (RF) energy based on an energy harvesting EH indication signal. A transmitting device such as a base station may transmit, to a user equipment (UE), an EH indication signal that indicates a time period when radio frequency (RF) energy is to be available. The UE may receive the EH indication signal and harvest RF energy from the RF signal during the time period. The transmitting device may transmit an RF signal to the UE or another UE during the time period. The UE may receive a wake up indication indicating a second time period to monitor a control channel. The UE may split power between energy harvesting and receiving RF signals during the second time period.

26 Claims, 9 Drawing Sheets

(56) References Cited

U.S. PATENT DOCUMENTS

| | | | | |
|---|---|---|---|---|
| 2015/0087255 A1* | 3/2015 | Wentzloff | ............ | H04B 1/1027 |
| | | | | 455/296 |
| 2015/0256015 A1* | 9/2015 | Gudan | ................... | H02J 7/025 |
| | | | | 307/104 |
| 2015/0256082 A1* | 9/2015 | Gudan | ................... | H02J 50/20 |
| | | | | 320/108 |
| 2015/0312936 A1* | 10/2015 | Nguyen | ............... | H04L 1/0061 |
| | | | | 370/280 |
| 2016/0091920 A1* | 3/2016 | Belogolovy | ...... | H02J 13/00024 |
| | | | | 307/104 |
| 2017/0013495 A1* | 1/2017 | Chae | ................. | H04B 17/3911 |
| 2017/0126263 A1* | 5/2017 | Rinaldi | ................... | H04B 1/18 |
| 2017/0181110 A1* | 6/2017 | Belogolovy | ............ | H02J 50/23 |
| 2019/0020290 A1* | 1/2019 | Feng | ..................... | H02N 2/188 |
| 2019/0044392 A1* | 2/2019 | Chowdhury | ............ | H02J 50/12 |
| 2019/0089204 A1* | 3/2019 | Lee | .................... | H04W 52/248 |
| 2019/0094931 A1* | 3/2019 | Ahmed | ................. | G06Q 50/06 |
| 2019/0268849 A1* | 8/2019 | Lopez | ................. | H04B 7/0404 |

FOREIGN PATENT DOCUMENTS

| | | | | |
|---|---|---|---|---|
| WO | WO-2019108940 A1 * | 6/2019 | ........... | H04B 7/0404 |
| WO | 2020131813 A1 | 6/2020 | | |
| WO | 2020131907 A1 | 6/2020 | | |
| WO | WO-2020131907 A1 * | 6/2020 | ........ | H04W 52/0229 |
| WO | WO-2020236664 A1 * | 11/2020 | ............ | H02J 50/001 |
| WO | WO-2020236665 A1 * | 11/2020 | ............ | H02J 50/001 |
| WO | WO-2021154610 A1 * | 8/2021 | ............ | H02J 50/001 |
| WO | WO-2021155209 A1 * | 8/2021 | ............ | H02J 50/001 |

* cited by examiner

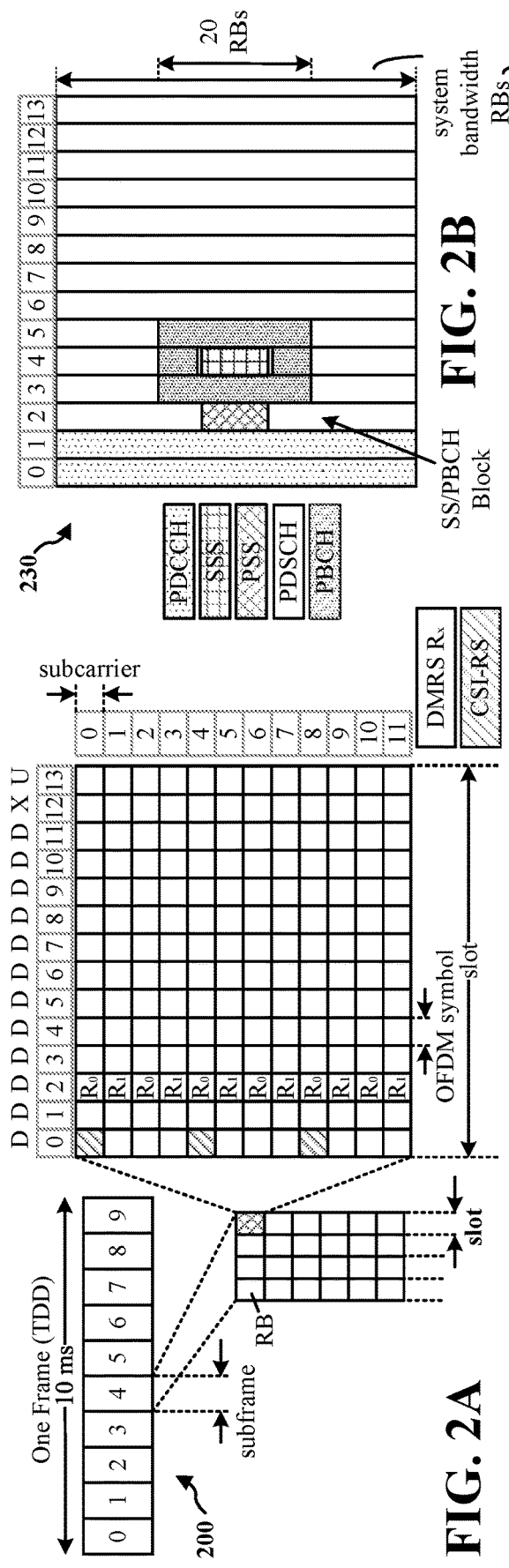
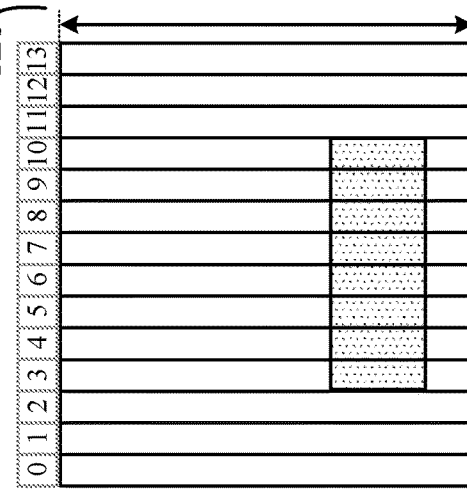
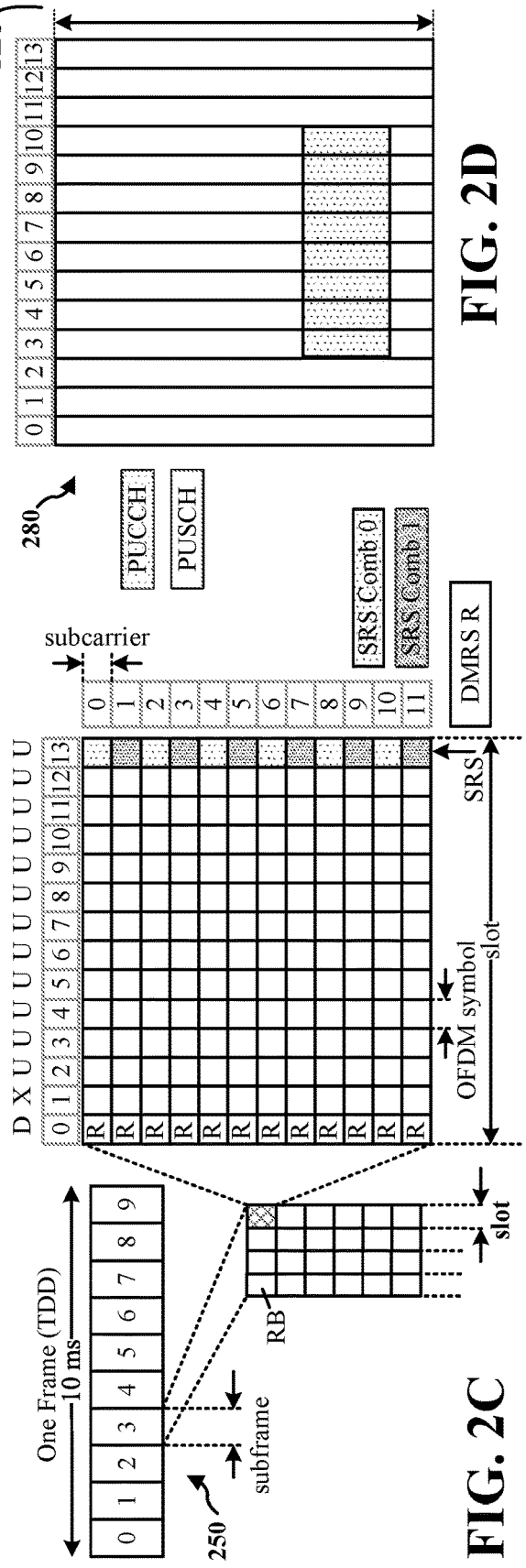

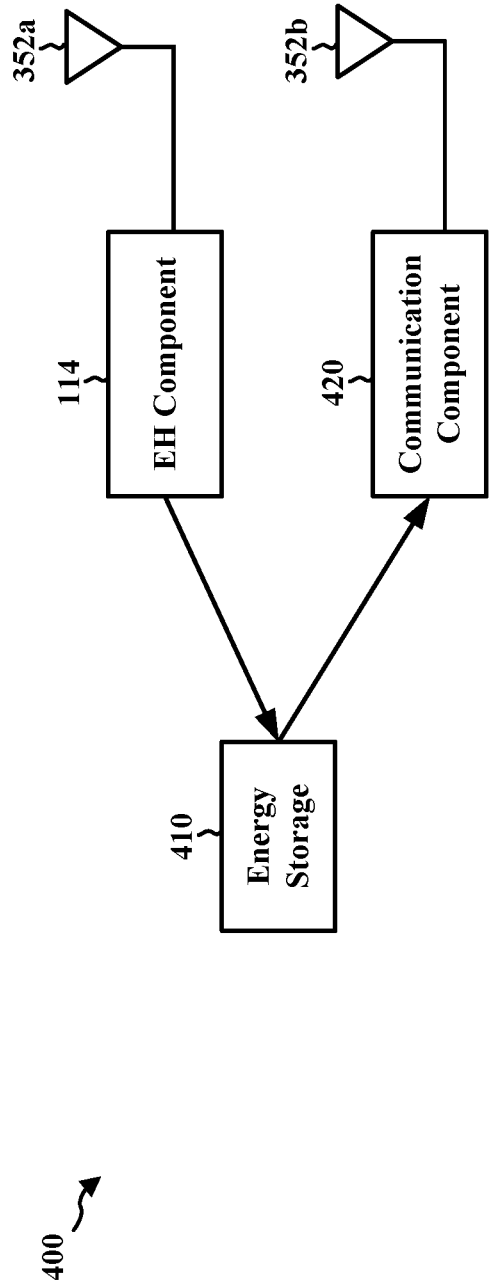 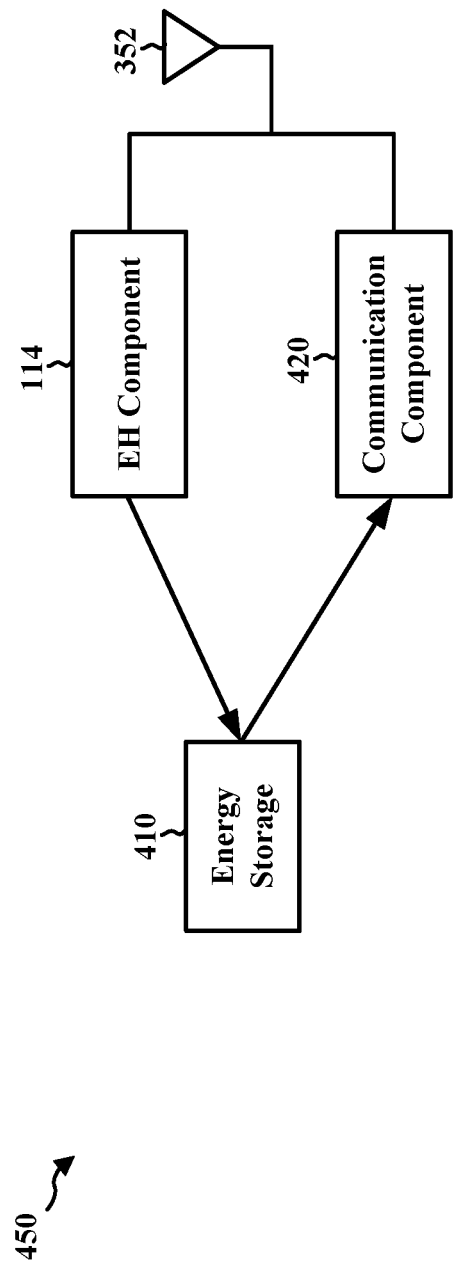

RADIO FREQUENCY ENERGY HARVESTING INDICATION SIGNAL

BACKGROUND

Technical Field

The present disclosure relates generally to communication systems, and more particularly, to apparatus and methods of a radio frequency (RF) energy harvesting indication signal.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, the present disclosure provides a method, apparatus, and non-transitory computer readable medium for harvesting radio frequency (RF) energy based on an energy harvesting indication signal. The method may include receiving, from a second device, an energy harvesting indication signal that indicates a time period when a radio frequency (RF) signal is to be transmitted by the second device. The method may include harvesting RF energy from the RF signal during the time period.

The present disclosure also provides an apparatus (e.g., a UE) including a memory storing computer-executable instructions and at least one processor configured to execute the computer-executable instructions to perform the above method, an apparatus including means for performing the above method, and a non-transitory computer-readable medium storing computer-executable instructions for performing the above method.

In another aspect, the present disclosure provides a method, apparatus, and non-transitory computer readable medium for signaling a time period for RF energy harvesting. The method may include transmitting, to a user equipment (UE), an energy harvesting indication signal that indicates a time period when radio frequency (RF) energy is to be available. The method may include transmitting an RF signal to the UE or another UE during the time period.

The disclosure also provides an apparatus (e.g., a base station) including a memory storing computer-executable instructions and at least one processor configured to execute the computer-executable instructions to perform the above method, an apparatus including means for performing the above method, and a non-transitory computer-readable medium storing computer-executable instructions for performing the above method.

To the accomplishment of the foregoing and related ends, the one or more aspects comprise the features hereinafter described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first 5G NR frame.

FIG. 2B is a diagram illustrating an example of DL channels within a 5G NR subframe.

FIG. 2C is a diagram illustrating an example of a second 5G NR frame.

FIG. 2D is a diagram illustrating an example of UL channels within a 5G NR subframe.

FIG. 4A is a diagram illustrating a first example hardware architecture for energy harvesting.

FIG. 4B is a diagram illustrating a second example hardware architecture for energy harvesting.

DETAILED DESCRIPTION

Figure 1:
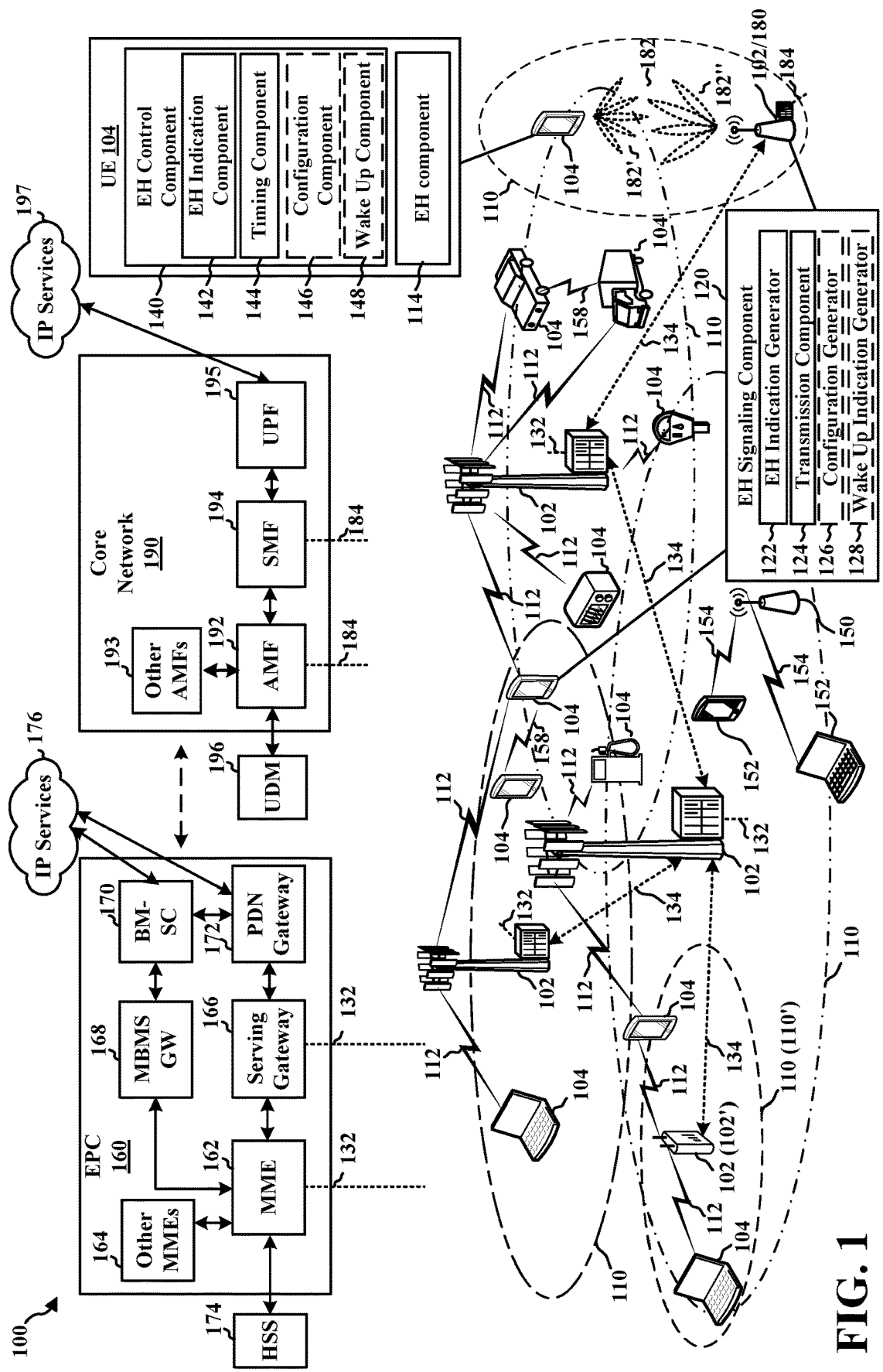
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Wireless communications systems have conventionally focused on improved quality for premium services such as enhanced mobile broad band (eMBB), ultra-reliable low latency communication (URLLC), and vehicle to anything (V2X) services. There is also a need to provide service for reduced capability (RedCap) devices such as wearables, industrial wireless sensor networks, surveillance cameras, and low-end smartphones. For such RedCap devices, metrics such as peak throughput, bandwidth, latency, and reliability may be less important than efficiency and cost improvements. One example service for RedCap devices is low power wide area (LPWA) communications with improvements to coverage with reduced complexity and power consumption. Example use cases for LPWA communications include metering devices, asset tracking, and Internet of Things (IoT). One technique to provide reduced power consumption is energy harvesting.

Energy harvesting (EH) may broadly include different physical mechanisms such as solar, thermal, wind, and kinetic. In particular, using radio frequency (RF) based energy harvesting, a device may obtain energy from wireless waveforms over the air. In comparison to other physical mechanisms, the RF energy harvesting may be more flexible as an RF signal can be used under various conditions such as indoors, at night, and while stationary. One issue with RF energy harvesting is that RF signals may not always be present. For example, idle and inactive state discontinuous reception (DRX) modes are used when a UE is not scheduled to receive a transmission. An RF energy harvesting circuit may draw some power even when no RF signal is available to harvest, which may result in negative power savings. Accordingly, it may be desirable to control RF energy harvesting based on availability of RF energy.

In an aspect, the present disclosure provides for an energy harvesting (EH) indication signal that identifies a time period when RF signals are available for energy harvesting. Generally, a UE may be scheduled for communications that have a shorter duration than available RF energy. For example, if a UE has little data to receive or transmit, the UE may be scheduled for periodic short bursts. RF energy may be available outside of the periodic short bursts, for example, from communications between a base station and other UEs. The EH indication signal may identify a time period including such available RF energy. The UE may harvest energy from RF signals during the time period.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media, which may be referred to as non-transitory computer-readable media. Non-transitory computer-readable media may exclude transitory signals. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

In an aspect, one or more of the UEs 104 may include an energy harvesting (EH) component 114 for harvesting energy and an EH control component 140 for controlling the EH component 114 based on an EH indication signal. The EH control component 140 may include an EH indication component 142 for receiving, from a second device (e.g., base station 102 or another UE 104), an EH indication signal that indicates a time period when an RF signal is to be transmitted by the base station. The EH control component 140 may include a timing component 144 that controls the EH component 114 to harvest RF energy from the RF signal during the time period. In some implementations, the EH control component 140 optionally includes a configuration component 146 configured to receive a configuration message indicating when the UE is to monitor for the energy harvesting indication signal. In some implementations, the EH control component 140 optionally includes a wake up component 148 configured to receive a wake up indication indicating a second time period to monitor a control channel.

In an aspect, one or more transmitting devices (e.g., a base station 102 or another UE 104 transmitting sidelink communications) may include an EH signaling component 120 configured to transmit an EH indication signal. The EH signaling component 120 may include an EH indication generator 122 configured to transmit, to a UE 104, an EH indication signal that indicates a time period when RF energy is to be available. The EH signaling component 120 may include a transmission component 124 configured to transmit an RF signal to the UE or another UE during the time period. The EH signaling component 120 may optionally include a configuration generator configured to transmit a configuration message indicating when the UE is to monitor for the energy harvesting indication signal. The EH signaling component 120 may optionally include a wake up indication generator 128 configured to transmit a wake up indication indicating a second time period for the UE to monitor a control channel.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface), which may be wired or wireless. The base stations 102 configured for 5G NR (collectively referred to as Next Generation RAN (NG-RAN)) may interface with core network 190 through second backhaul links 184, which may be wired or wireless. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 112 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 112 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the Institute of Electrical and Electronics Engineers (IEEE 802.11) standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a packet switched (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be frequency domain duplexed (FDD) in which for a particular set of subcarriers (carrier system bandwidth), subframes within the set of subcarriers are dedicated for either DL or UL, or may be time domain duplexed (TDD) in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) ACK/NACK feedback. The PUSCH carries data, and may additionally be used to carry a buffer status report (BSR), a power headroom report (PHR), and/or UCI.

Figure 3:
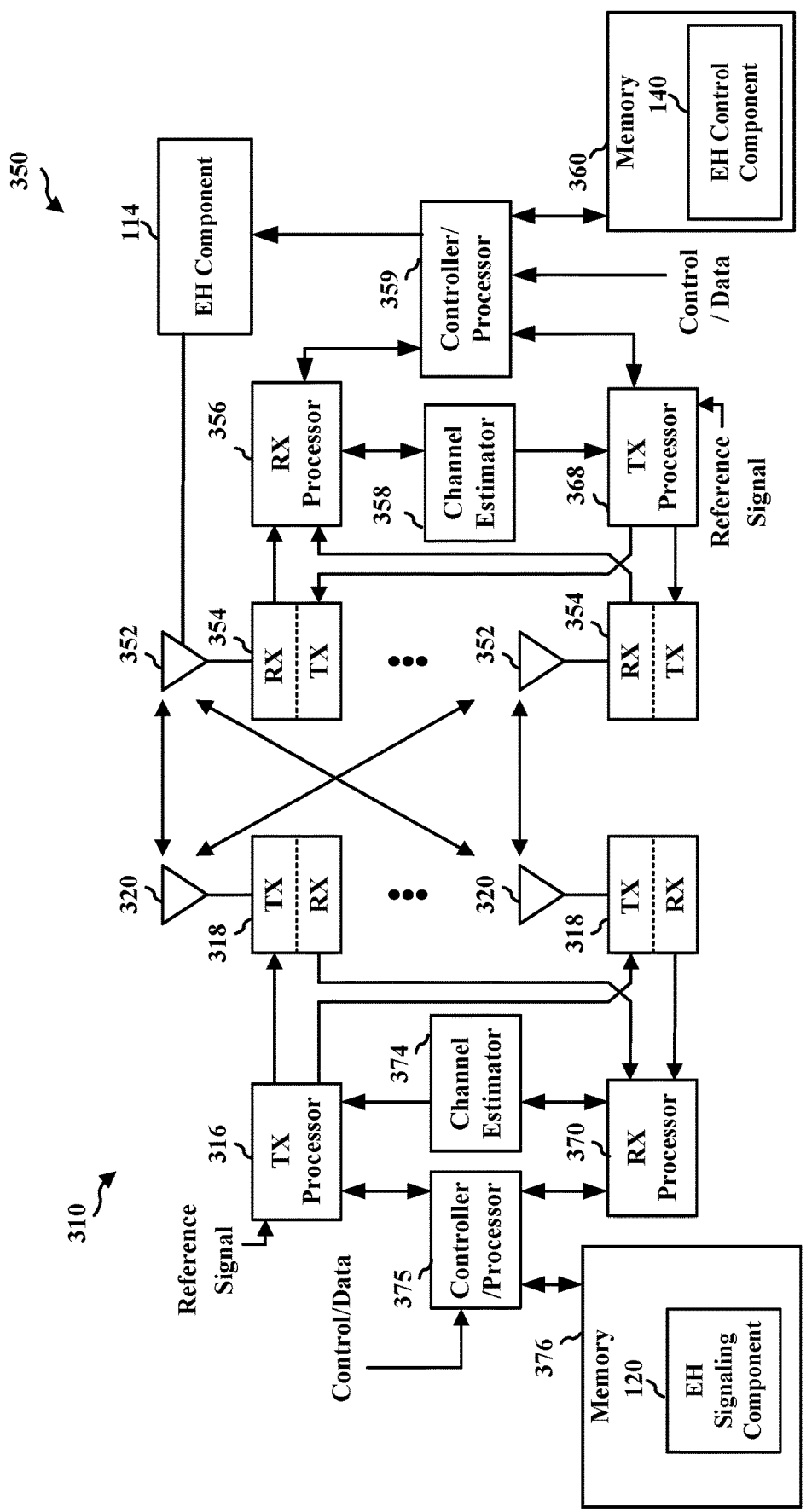
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with, and coupled to, a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an acknowledge (ACK) and/or negative acknowledge (NACK) protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with, and coupled to, a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

In an aspect, the UE 350 may include a EH component 114. The EH component 114 may be a circuit configured to harvest RF energy and store the harvested energy. The EH component 114 may include an RF to DC circuit configured to convert RF energy to DC current. The EH component 114 may include a battery or capacitor for storing the harvested energy. The EH component 114 may be coupled to one or more of the antennas 352. In some implementations, the EH component 114 may include a separate antenna. The EH component 114 may be controlled by the controller/processor 359 executing the EH control component 140.

At least one of the TX processor 368, the RX processor 356, and the controller/processor 359 may be configured to perform aspects in connection with the EH control component 140 of FIG. 1. For example, the memory 360 may include executable instructions defining the EH control component 140. The TX processor 368, the RX processor 356, and/or the controller/processor 359 may be configured to execute the EH control component 140.

At least one of the TX processor 316, the RX processor 370, and the controller/processor 375 may be configured to perform aspects in connection with the EH signaling component 120 of FIG. 1. For example, the memory 376 may include executable instructions defining the EH signaling component 120. The TX processor 316, the RX processor 370, and/or the controller/processor 375 may be configured to execute the EH signaling component 120.

FIG. 4A is a schematic diagram illustrating a first example hardware architecture 400 for energy harvesting. The architecture 400 may include separate antennas 352a and 352b for energy harvesting and communications. The antenna 352a may be connected to the EH component 114. The antenna 352b may be connected to a communication component 420. The communication component 420 may include, for example, one or more transceivers (e.g., RX/TX 354), the channel estimator 358, the RX processor 356, and the Tx processor 368. The EH component 114 may be connected to an energy storage 410, which may include, for example, a capacitor and/or a battery. The EH component 114 may charge the energy storage 410 with energy harvested from RF signals received via the antenna 352a. The energy storage 410 may provide energy to the communication component 420.

FIG. 4B is a schematic diagram illustrating a second example hardware architecture 450 for energy harvesting. The architecture 450 may include a shared antenna 352 for energy harvesting and communications. Energy received on the antenna 352 may be shared between the EH component 114 and the communication component 420. As in the architecture 400, the EH component 114 may be connected to an energy storage 410 and charge the energy storage 410 with energy harvested from RF signals received via the antenna 352. The energy storage 410 may provide energy to the communication component 420 (e.g., for processing the received RF signals or transmitting RF signals).

Figure 5:
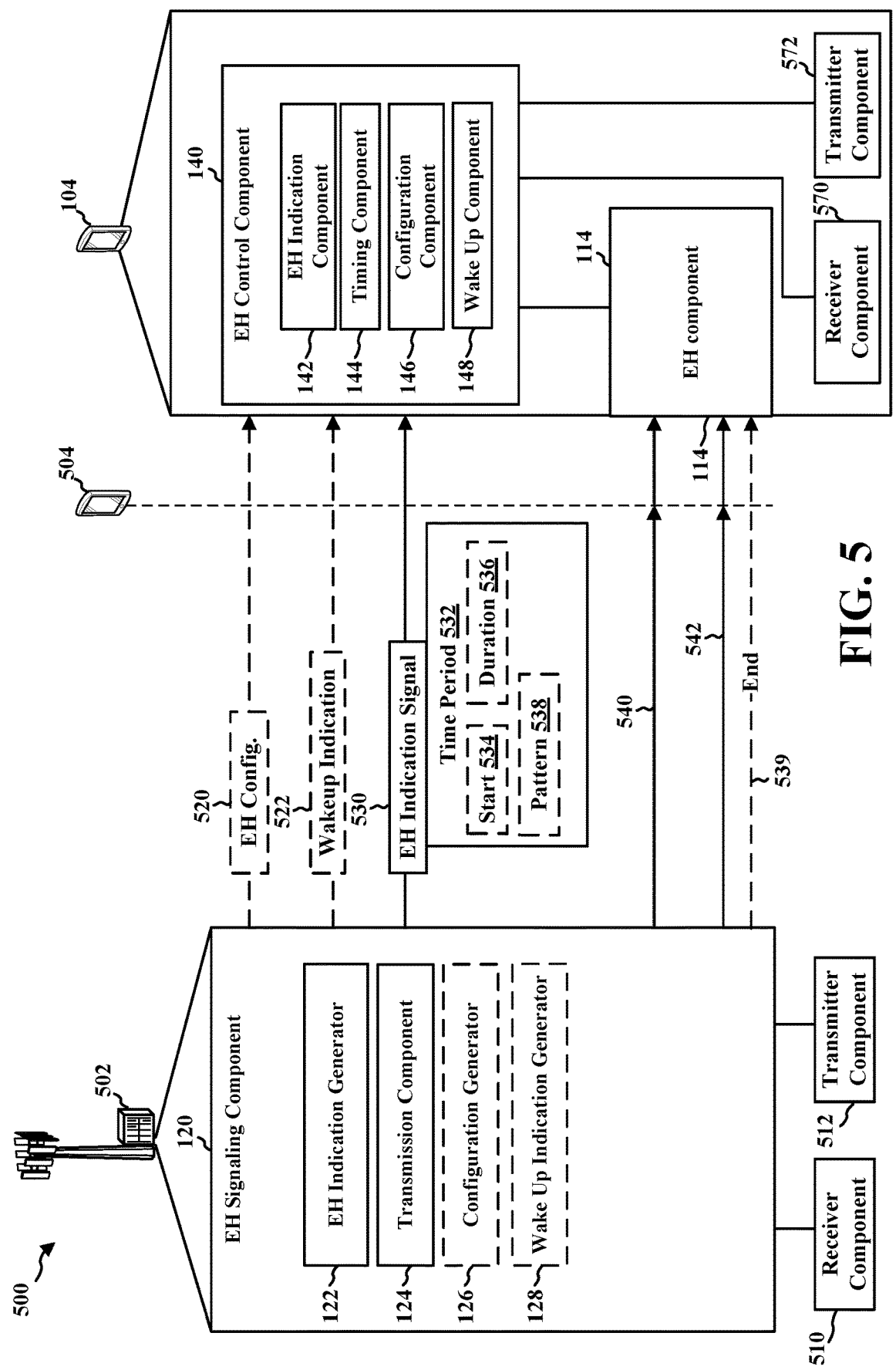
FIG. 5 is a diagram illustrating example communications and components a base station and a UE.

FIG. 5 is a diagram 500 illustrating example communications and components of a transmitting device 502 (e.g., a base station 102 or a UE 104) and a UE 104 configured to harvest energy. The transmitting device 502 includes the EH signaling component 120 and the UE 104 includes the EH component 114 and the EH control component 140. The EH signaling component 120 may be implemented by the memory 376 and the TX processor 316, the RX processor 370, and/or the controller/processor 375 of FIG. 3. For example, the memory 376 may store executable instructions defining the EH signaling component 120 and the TX processor 316, the RX processor 370, and/or the controller/processor 375 may execute the instructions. The EH control component 140 may be implemented by the memory 360 and the TX processor 368, the RX processor 356, and/or the controller/processor 359. For example, the memory 360 may store executable instructions defining the EH control component 140 and the TX processor 368, the RX processor 356, and/or the controller/processor 359 may execute the instructions.

The transmitting device 502 may include a receiver component 510, which may include, for example, a radio frequency (RF) receiver for receiving the signals described herein. The transmitting device 502 may include a transmitter component 512, which may include, for example, an RF transmitter for transmitting the signals described herein. In an aspect, the receiver component 510 and the transmitter component 512 may co-located in a transceiver such as illustrated by the TX/RX 318 in FIG. 3.

As discussed briefly above with respect to FIG. 1, the EH signaling component 120 may include the EH indication generator 122 and the transmission component 124. The EH signaling component 120 may optionally include the configuration generator 126 and/or the wake up indication generator 128. The UE 104 may include a receiver component 570, which may include, for example, RF receiver for receiving the signals described herein. The UE 104 may include a transmitter component 572, which may include, for example, an RF transmitter for transmitting the signals described herein. In an aspect, the receiver component 570 and the transmitter component 572 may co-located in a transceiver such as illustrated by the TX/RX 354 in FIG. 3.

The transmitting device 502 may transmit an EH configuration 520. The EH configuration 520 may be, for example, an RRC configuration message. The EH configuration 520 may indicate when the UE 104 is to monitor for the energy harvesting indication signal. For example, the EH configuration 520 may include a periodicity, a starting time within each period, and a repetition pattern within each period. The EH configuration 520 may define when the UE 104 is to monitor for the energy harvesting indication signal for a connected mode, an idle/inactive mode, or both. The EH configuration 520 may be applicable during a DRX sleep state, an awake state, or both. In an aspect, the EH configuration 520 may be transmitted when the EH indication signal 530 is transmitted separately from the wake up indication 522. In implementations where the EH indication signal 530 is transmitted jointly with the wake up indication 522, the joint signal may be transmitted according to a configuration of the wake up indication 522.

The transmitting device 502 may transmit a wake up indication 522 to the UE 104. The wake up indication 522 may be a signal that identifies a time when the UE 104 is to wake up to monitor a PDCCH. The wake up indication 522 may include an RRC configuration defining a DRX cycle, a connected mode wake up signal, or an idle mode paging early indication signal.

The transmitting device 502 may transmit the EH indication signal 530. The EH indication signal 530 may indicate a time period 532. In some implementations, the time period 532 may include a start 534. For example, the start 534 may define a time of a first RF signal for energy harvesting. There may be a gap between the EH indication signal 530 and the start 534. For example, the UE 104 may activate the EH component 114 during the gap. In some implementations, the time period 532 may include a duration 536. The duration 536 may define an end 539 of the time period 532. The EH control component 140 may deactivate the EH component 114 after the duration 536 (e.g., because RF energy may no longer be available for harvesting). The time period 532 may include a pattern 538 of RF energy. For example, the pattern 538 may define how long RF energy is available for harvesting in each period of a repetition pattern and a duration of each period. In some implementations, the EH indication signal 530 and/or the time period 532 may include only the start 534. The transmitting device 502 may transmit a signal indicating the end 539 of the time period 532. The time period 532 may extend from the start 532 until the signal indicating the end 539 of the time period 532 is received.

The EH indication signal 530 may be transmitted jointly with the wake up indication 522 or independently. In some implementations, the wake up indication 522 and the EH indication signal 530 may be carried on the PDCCH as a downlink control information (DCI). For example, the DCI may have a DCI format 1_0 and be scrambled with a paging radio network temporary identifier (P-RTNI). Such a wake up indication 522 may be referred to as a paging PDCCH. The paging PDCCH may include fields such as a short message field, a resource assignment, and reserved bits. The short message field or the reserved bits may include the EH indication signal 530. In some implementations, the resource assignment field may define the time period 532 and frequency resource for the paging message. In another implementation, the wake up indication 522 and the EH indication signal 530 may be carried on the PDCCH as a connected mode wake up signal, for example using DCI format 2_6. The DCI format 2_6 may be extended to indicate the energy harvesting operation. In another implementation, the wake up indication 522 and the EH indication signal 530 may be transmitted as an idle/inactive mode paging early indication signal.

In an implementation, the EH indication signal 530 may be transmitted independently by a reference signal (RS) or sequence based transmission. For example, a sequence for the secondary synchronization signal (SSS) may be selected to indicate availability of RF energy. In another aspect, the sequence for an RS such as a tracking reference signal (TRS)

or channel state information RS (CSI-RS) may be selected to indicate availability of RF energy. For example, a designated RS or sequence may be transmitted to indicate that RF energy is to be available and that the UE 104 may start to harvest energy. In some implementations, a second RS or sequence may indicate that the UE should stop harvesting energy and/or go to sleep. In some other implementations, the RS or sequence may be associated with a duration, and the UE may harvest energy during the duration.

The transmitting device 502 may transmit a control channel 540 (e.g., a DCI on PDCCH). The control channel 540 may schedule a transmission such as a data channel 542 (e.g., a PDSCH or physical sidelink shared channel (PSSCH)). In an aspect, the control channel 540 may be scrambled with a RNTI for another UE 504. Accordingly, the UE 104 may not decode the control channel 540. However, based on the EH indication signal 530, the UE 104 may be aware that the base station is to transmit an RF signal and that RF energy is to be available. Accordingly, the UE 104 may harvest energy from the RF signals carrying the control channel 540 and/or the data channel 542 via the EH component 114.

Figure 6:
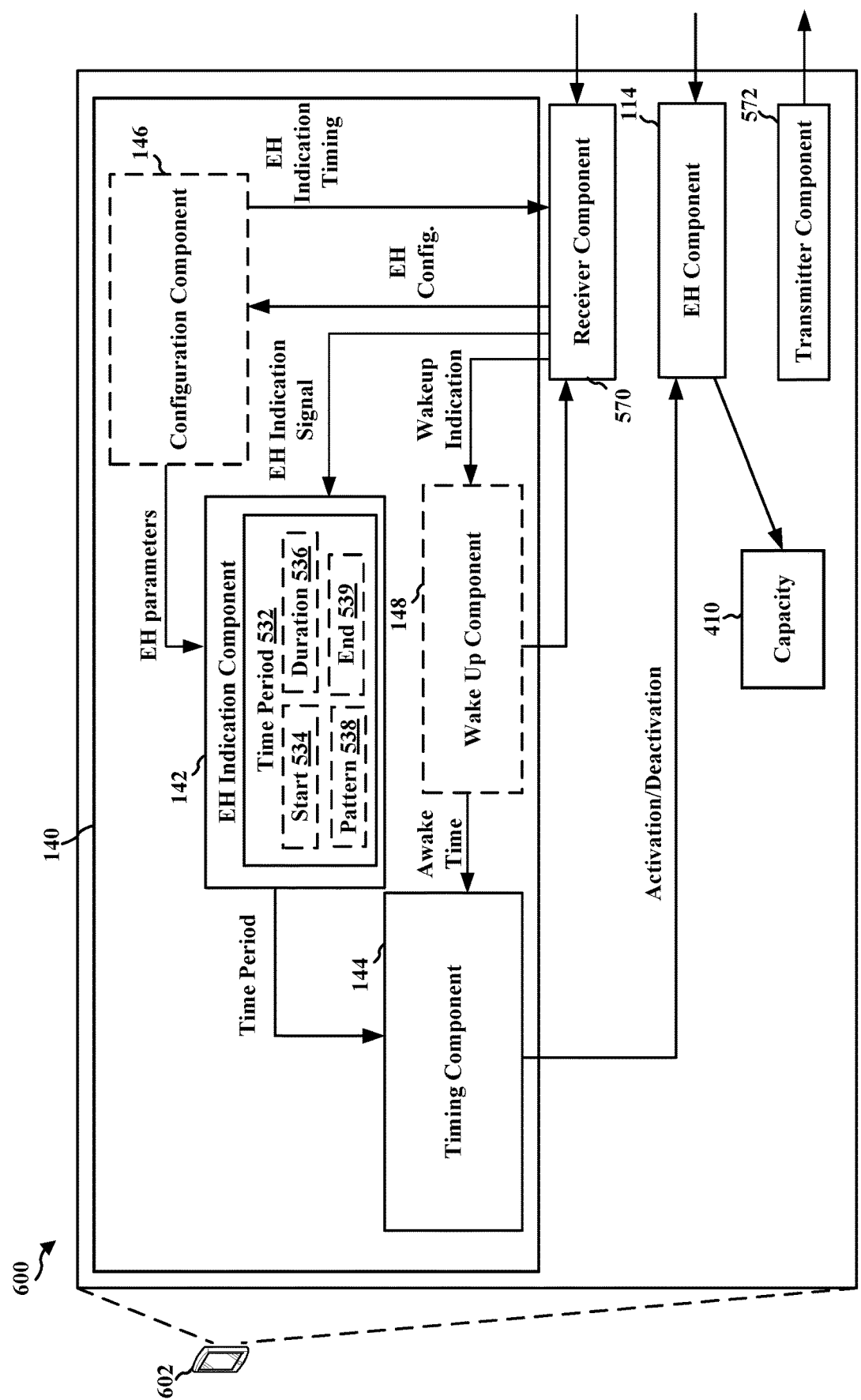
FIG. 6 is a conceptual data flow diagram illustrating an example data flow between different means/components in an example UE including an energy harvesting (EH) component.

FIG. 6 is a conceptual data flow diagram 600 illustrating the data flow between different means/components in an example UE 602, which may be an example of the UE 104 (or UE 350) including the EH control component 140 and the EH component 114 with reference to FIGS. 1, 3, and 5.

The receiver component 570 may receive various signals including the EH configuration 520, the wake up indication 522, and/or the EH indication signal 530. The receiver component 570 may provide the EH configuration 520 to the configuration component 146. The receiver component 570 may provide the wake up indication 522 to the wake up component 148. The receiver component 570 may provide the EH indication signal 530 to the EH indication component 142.

The configuration component 146 may receive the EH configuration 520 via the receiver component 570. For example, the EH configuration 520 may be a RRC configuration message. The configuration component 146 may extract information elements from the EH configuration 520, for example, based on a definition of an EH configuration message. The EH configuration 520 may include, for example, an EH indication timing. The EH indication timing may indicate time periods in which an EH indication signal may be received. For example, the EH indication timing may include a periodicity, a starting time within each period, and a repetition pattern within each period. The EH indication timing may be different than a paging cycle or a DRX cycle. The configuration component 146 may configure the receiver component 570 with the EH indication timing so that the receiver component 570 receives signals that may include the EH indication signal 530. The EH configuration 520 may include, for example, EH parameters. For instance, the EH parameters may include a mapping of sequences or reference signals to a time period 532. As another example, the EH parameters may indicate how to interpret reserved bits of a DCI such as a paging PDCCH or wake up signal. The configuration component may provide the EH parameters to the EH indication component 142.

The EH indication component 142 may receive the EH indication signal 530 via the receiver component 570. The EH indication component 142 may receive the EH parameters from the configuration component 146. The EH indication component 142 may decode the EH indication signal 530 to determine the time period 532. For example, in implementations where the EH indication signal 530 is a DCI, the EH indication component 142 may perform blind decoding of PDCCH candidates based on a DCI format for the EH indication signal 530. If the EH indication component 142 detects an EH indication signal 530 for the UE 602, the EH indication component 142 may interpret bits of the DCI based on the EH parameters. For example, the EH indication component 142 may interpret the bits of the DCI as values of one or more of the start 534, the duration 536, or the pattern 538 based on the DCI format and the EH parameters. The EH indication component 142 may provide the values defining the time period 532 to the timing component 144.

The wake up component 148 may receive the wake up indication 522 via the receiver component 570. The wake up component 148 may determine an awake time during which the UE 602 is to monitor a control channel. For example, the awake time may be a DRX on period or a paging occasion. The wake up component 148 may control the receiver component 570 to receive signals during the awake time. The wake up component 148 may place the receiver component in a sleep mode after the awake time. In some implementations, the wake up component 148 may provide the awake time to the timing component 144.

The timing component 144 may receive the time period 532 from the EH indication component 142. The timing component 144 may control the EH component 114 to perform energy harvesting during the time period 532. For example, the timing component 144 may provide an activation or deactivation signal to the EH component 114.

In an aspect, the timing component 144 may receive an awake time from the wake up component 148 based on a wake up indication 522 in addition to the time period 532 from the EH indication component 142. The timing component 144 may determine the time period 532 based on an assumption that the awake time and the time period 532 do not conflict. In a first implementation, the wake up indication 522 may override the EH indication signal 530. For example, if the wake up indication indicates a monitoring window that is longer than the time period 532 indicated by the EH indication signal 530, the timing component 144 may extend the time period 532 based on the wake up indication. In a second implementation, the wake up indication may indicate a monitoring window that is within the time period 532 when RF energy is to be available. The timing component 144 may control the EH component 114 to harvest energy during the entire time period 532, but power splitting may be utilized during the monitoring window.

The EH component 114 may receive a control signal (e.g., activation or deactivation) from the timing component 144. When activated, the EH component 114 may harvest energy from RF signals. The EH component 114 may charge the energy storage 410 with the harvested energy. The other components of the UE 104 (e.g., receiver component 570) may draw energy from the energy storage 410.

Figure 7:
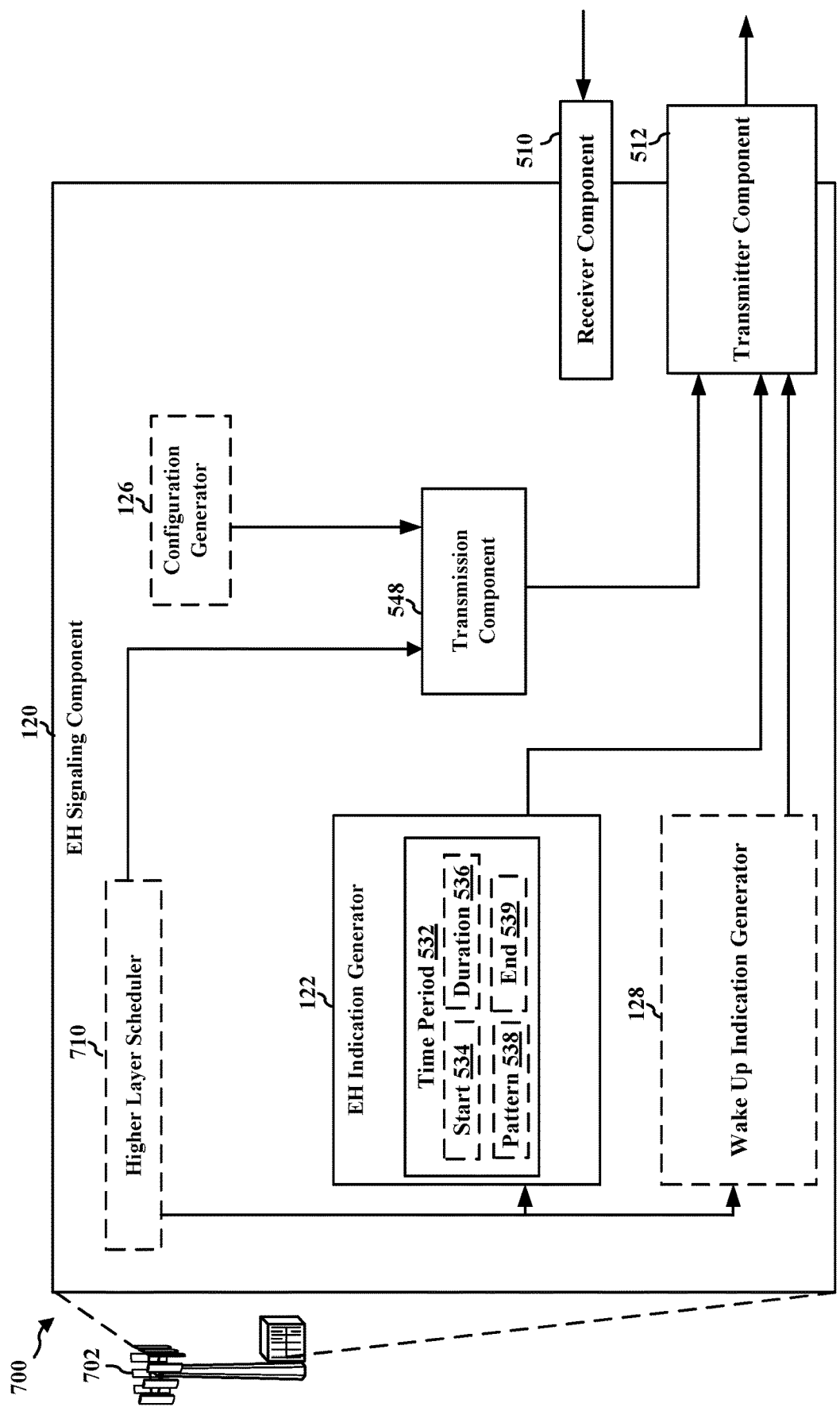
FIG. 7 is a conceptual data flow diagram illustrating an example data flow between different means/components in an example base station including a EH signaling component.

FIG. 7 is a conceptual data flow diagram 700 illustrating the data flow between different means/components in an example transmitting device 702, which may be an example of the base station 102, the base station 310, or the transmitting device 502 and include the EH signaling component 120 with reference to FIGS. 1, 3, and 5. In some implementations, the transmitting device 702 may be a UE including the EH signaling component 120.

The EH signaling component 120 may include a higher layer scheduler 710 that determines transmissions for one or more UEs. The higher layer scheduler 710 may provide scheduling information to the EH indication generator 122, the wake up indication generator 128, and the transmission component 124.

The EH indication generator 122 may receive scheduling information for one or more UEs from the higher layer scheduler 710. The EH indication generator 122 may determine the time period 532 when RF energy is available at the UE 104 based on the scheduling information. The RF energy may be a transmission to any UE, not just the UE 104 that is to harvest the energy. For example, the EH indication generator 122 may determine that the time period 532 includes any time when the transmitting device 702 is scheduled to transmit on a threshold amount of resources. In some implementations, the EH indication generator 122 may account for frequency band, transmission power, beamforming, or other characteristics of scheduled transmissions. For example, the EH indication generator 122 may determine whether an RF waveform for transmission is strong enough for the UE to harvest energy from the RF waveform. The EH indication generator 122 may characterize the time period 532 based on a start 534, duration 536, pattern 538 and/or end 539. The EH indication generator 122 may generate the EH indication signal 530 to indicate the time period 532. The EH indication generator 122 may transmit the EH indication signal 530 via the transmitter component 512.

The transmission component 548 may receive the scheduling information from the higher layer scheduler 710. The transmission component 548 may transmit RF signals based on the scheduling information to the UE or another UE during the time period. For example, the RF signals may include the control channel 540 and the data channel 542. The transmission component 548 may transmit the RF signals via the transmitter component 512. In some implementations, the transmission component 548 may boost a transmission power of the RF signals during the time period to improve energy harvesting at the UE 104.

In some implementations, the configuration generator 126 may generate the EH configuration 520. For example, the configuration generator 126 may generate the EH configuration 520 for a particular UE based on reported capabilities of the UE. Where the EH configuration 520 is an RRC message, the configuration generator 126 may provide the EH configuration 520 to the transmission component 124 for inclusion in a data channel 542 and transmission via the transmitter component 512.

In some implementations, the wake up indication generator 128 may receive the scheduling information from the higher layer scheduler 710. The wake up indication generator 128 may determine whether any transmissions are scheduled for the UE 104. The wake up indication generator 128 may generate the wake up indication 522 when transmissions are scheduled for the UE 104. The wake up indication generator 128 may transmit the wake up indication 522 via the transmitter component 512.

Figure 8:
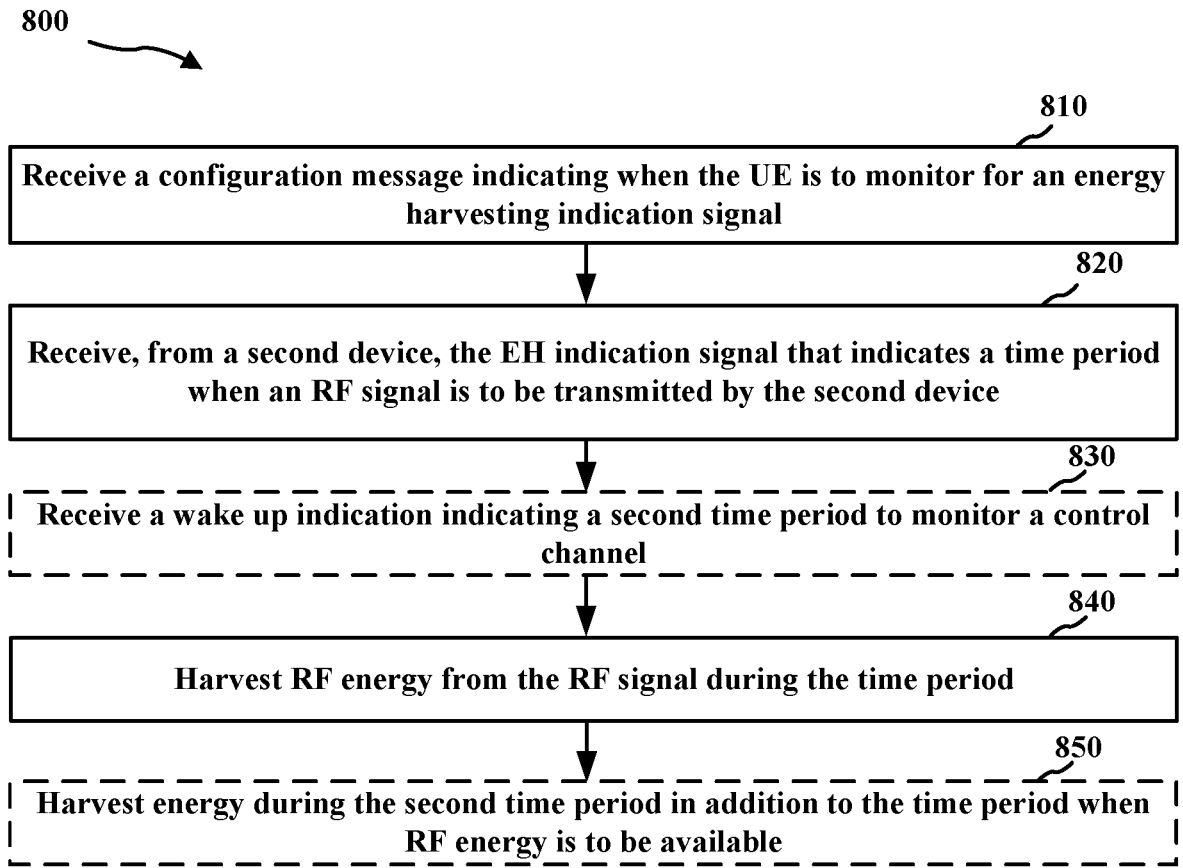
FIG. 8 is a flowchart of an example method of energy harvesting based on an indication signal.

FIG. 8 is a flowchart of an example method 800 for harvesting RF energy from an RF signal based on an energy harvesting indication signal. The method 800 may be performed by a UE (such as the UE 104, which may include the memory 360 and which may be the entire UE 104 or a component of the UE 104 such as the EH control component 140, the EH component 114, TX processor 368, the RX processor 356, or the controller/processor 359). The method 800 may be performed by the EH control component 140 in communication with the EH signaling component 120 of the transmitting device 502.

At block 810, the method 800 may optionally include receiving a configuration message indicating when the UE is to monitor for the energy harvesting indication signal. In an aspect, for example, the UE 104, the RX processor 356 and/or the controller/processor 359 may execute the EH control component 140 and/or the configuration component 146 to receive the configuration message (e.g., EH configuration 520) indicating when the UE is to monitor for the EH indication signal 530. Accordingly, the UE 104, the RX processor 356, and/or the controller/processor 359 executing the EH control component 140 and/or the configuration component 146 may provide means for receiving a configuration message indicating when the UE is to monitor for the energy harvesting indication signal.

At block 820, the method 800 may include receiving, from a second device, the energy harvesting indication signal that indicates a time period when an RF signal is to be transmitted by the second device. In an aspect, for example, the UE 104, the RX processor 356 and/or the controller/processor 359 may execute the EH control component 140 and/or the EH indication component 142 to receive, from the second device (e.g., transmitting device 502), the energy harvesting indication signal 530 that indicates a time period 532 when an RF signal (e.g., control channel 540 or data channel 542) is to be transmitted by the second device. For example, in some implementations, the energy harvesting indication signal 530 may indicate a start 534 of the time period 532. The EH indication component 142 may later receive an indication of an end 539 of the time period 532. In some other implementations, the energy harvesting indication signal 530 indicates a duration 536 of the time period. In some other implementations, the energy harvesting indication signal indicates a pattern of the RF energy within the time period. In some implementations, there is a gap between a time when the energy harvesting indication signal is received and a start of the time period. In some implementations, the energy harvesting indication signal is included in a paging PDCCH message within reserved bits or a short message field. In some implementations, the energy harvesting indication signal is included in a connected mode wake up signal or an idle mode paging early indication signal. In some implementations, the connected mode wake up signal or the idle mode paging early indication signal includes a single bit indicating whether the time period is for communication, energy harvesting, or both. In some implementations, the connected mode wake up signal or the idle mode paging early indication signal includes a first bit indicating whether the time period is for communication and a second bit indicating whether the time period is for energy harvesting. In some implementations, the energy harvesting indication signal is a distinct sequence of a reference signal. For example, the sequence of the reference signal may be one of: a sequence indicating that the time period is for communication, a sequence indicating that the time period is for energy harvesting, or a sequence indicating that the time period is for both communication and energy harvesting. Accordingly, the UE 104, the RX processor 356, and/or the controller/processor 359 executing the EH control component 140 and/or the EH indication component 142 may provide means for receiving, from a second device, the energy harvesting indication signal that indicates a time period when an RF signal is to be transmitted by the second device At block 830, the method 800 may optionally include receiving a wake up indication indicating a second time period to monitor a control channel. In an aspect, for example, the UE 104, the RX processor 356 and/or the controller/processor 359 may execute the EH control component 140 and/or the wake up component 148 to receive the wake up indication 522 indicating a second time period to monitor a control channel 540. Accordingly, the UE 104, the RX processor 356, and/or the controller/processor 359 executing the EH control component 140 and/or the wake up component 148 may provide means for receiving a wake up indication indicating a second time period to monitor a control channel.

At block 840, the method 800 may include harvesting RF energy from the RF signal during the time period. In an aspect, for example, the EH component 114 may harvest RF energy from the RF signal during the time period 532. In an aspect, the UE 104, the RX processor 356 and/or the controller/processor 359 may execute EH control component 140 and/or the timing component 144 to activate the EH component 114 during the time period 532. In some implementations, the second time period indicated by the wake up indication is within the time period when RF energy is to be available. The EH component 114 may split the received RF energy with the receiver component 570 during the second time period. Accordingly, the EH component 114 may provide means for harvesting RF energy from the RF signal during the time period. The UE 104, the RX processor 356, and/or the controller/processor 359 executing the EH control component 140 and/or the timing component 144 may provide means for activating the EH component 114 during the time period 532.

At block 850, the method 800 may optionally include harvesting energy during the second time period in addition to the time period when RF energy is to be available. In an aspect, for example, the EH component 114 may harvest RF energy during the second time period in addition to the time period when RF energy is to be available. The EH component 114 may split the received RF energy with the receiver component 570 during the second time period. Accordingly, the EH component 114 may also provide means for harvesting RF energy from the RF signal during the second time period. In an aspect, the UE 104, the RX processor 356 and/or the controller/processor 359 may execute EH control component 140 and/or the timing component 144 to activate the EH component 114 during the second time period. The UE 104, the RX processor 356, and/or the controller/processor 359 executing the EH control component 140 and/or the timing component 144 may provide means for activating the EH component 114 during the second time period.

Figure 9:
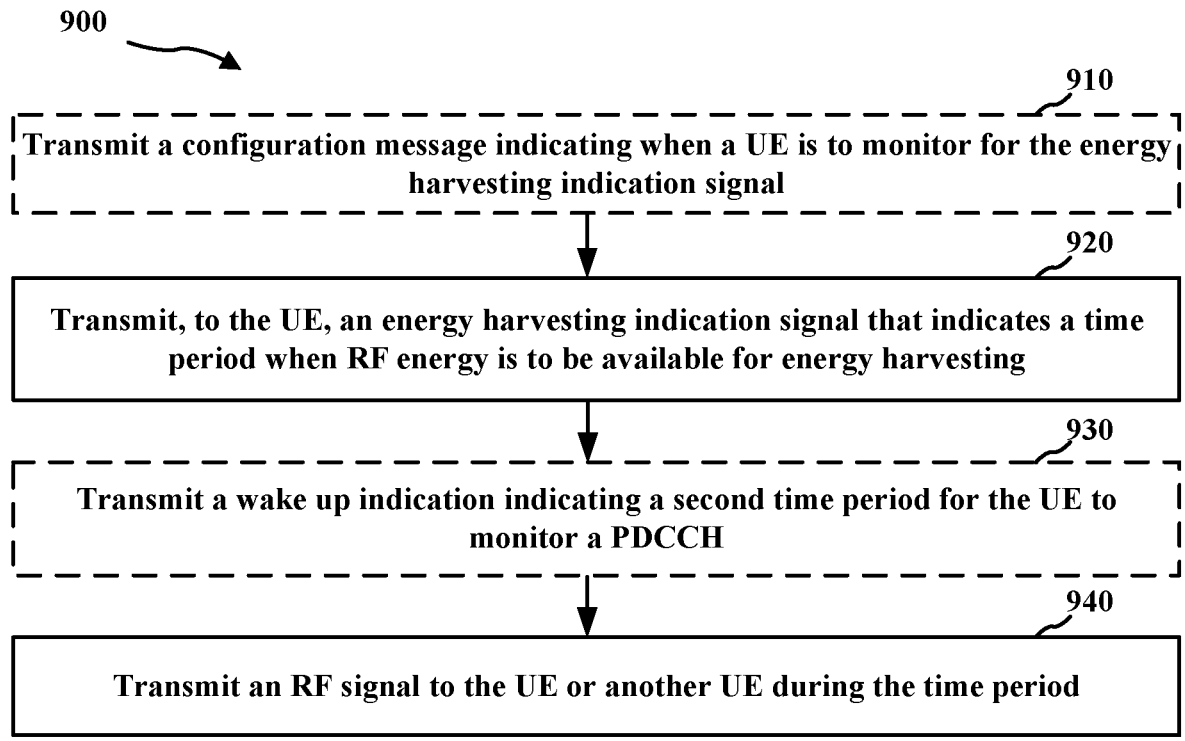
FIG. 9 is a flowchart of an example method of indicating a time period for energy harvesting.

FIG. 9 is a flowchart of an example method 900 for indicating a time period when RF energy is available for harvesting. The method 900 may be performed by a transmitting device (such as the transmitting device 502, the transmitting device 702, the base station 102, or a UE 104, which may include the memory 376 and which may be the entire transmitting device 502 or a component of the transmitting device 502 such as the EF signaling component 120, TX processor 316, the RX processor 370, or the controller/processor 375). The method 900 may be performed by the EH signaling component 120 in communication with the EH control component 140 of the UE 104.

At block 910, the method 900 may optionally transmitting a configuration message indicating when the UE is to monitor for the energy harvesting indication signal. In an aspect, for example, the transmitting device 502, the controller/processor 375, and/or the TX processor 316 may execute the EF signaling component 120 and/or the configuration generator 126 to transmit the configuration message (e.g., EH configuration 520) indicating when the UE 104 is to monitor for the energy harvesting indication signal 530. Accordingly, the transmitting device 502, the controller/processor 375, and/or the TX processor 316 executing the EF signaling component 120 and/or the configuration generator 126 may provide means for transmitting a message scheduling a first reception for a UE on first resources.

At block 920, the method 900 may include transmitting, to the UE, an energy harvesting indication signal that indicates a time period when RF energy is to be available for energy harvesting. In an aspect, for example, the transmitting device 502, the controller/processor 375, and/or the TX processor 316 may execute the EH signaling component 120 and/or the EH indication generator 122 to transmit, to the UE 104, the energy harvesting indication signal 530 that indicates the time period 532 when RF energy is to be available for energy harvesting. Accordingly, the transmitting device 502, the controller/processor 375, and/or the TX processor 316 executing the EH signaling component 120 and/or the EH indication generator 122 may provide means for transmitting, to the UE, an energy harvesting indication signal that indicates a time period when RF energy is to be available for energy harvesting.

At block 930, the method 900 may optionally include transmitting a wake up indication indicating a second time period for the UE to monitor a PDCCH. In an aspect, for example, the transmitting device 502, the controller/processor 375, and/or the TX processor 316 may execute the EH signaling component 120 and/or the wake up indication generator 128 to transmit a wake up indication indicating a second time period for the UE 104 to monitor a control channel. Accordingly, the transmitting device 502, the controller/processor 375, and/or the TX processor 316 executing the EH signaling component 120 and/or the wake up indication generator 128 may provide means for transmitting a wake up indication indicating a second time period for the UE to monitor a PDCCH.

At block 940, the method 900 may include transmitting an RF signal to the UE or another UE during the time period. In an aspect, for example, the transmitting device 502, the controller/processor 375, and/or the TX processor 316 may execute the EH signaling component 120 and/or the transmission component 124 to transmit the RF signal (e.g., control channel 540 or data channel 542) to the UE 104 or another UE during the time period 532. Accordingly, the transmitting device 502, the controller/processor 375, and/or the TX processor 316 executing the EH signaling component 120 and/or the transmission component 124 may provide means for transmitting an RF signal to the UE or another UE during the time period.

SOME FURTHER EXAMPLE CLAUSES

Implementation examples are described in the following numbered clauses:

1. A method of wireless communication, comprising, by a user equipment (UE):
receiving, from a second device, an energy harvesting indication signal that indicates a time period when an radio frequency (RF) signal is to be transmitted by the second device; and
harvesting RF energy from the RF signal during the time period.

2. The method of clause 1, wherein the energy harvesting indication signal indicates a start of the time period.

3. The method of clause 2, further comprising receiving an indication of an end of the time period.

4. The method of any of clauses 1-3, wherein the energy harvesting indication signal indicates a duration of the time period.

5. The method of any of clauses 1-4, wherein the energy harvesting indication signal indicates a pattern of the RF energy within the time period.

6. The method of any of clauses 1-5, wherein there is a gap between a time when the energy harvesting indication signal is received and a start of the time period.

7. The method of any of clauses 1-6, wherein the energy harvesting indication signal is included in a paging physical downlink control channel (PDCCH) within reserved bits or a short message field.

8. The method of any of clauses 1-6, wherein the energy harvesting indication signal is included in a connected mode wake up signal or an idle mode paging early indication signal.

9. The method of clause 8, wherein the connected mode wake up signal or the idle mode paging early indication signal includes a single bit indicating whether the time period is for communication, energy harvesting, or both.

10. The method of clause 8, wherein the connected mode wake up signal or the idle mode paging early indication signal includes a first bit indicating whether the time period is for communication and a second bit indicating whether the time period is for energy harvesting.

11. The method of any of clauses 1-10, further comprising:
receiving a wake up indication indicating a second time period to monitor a control channel; and
harvesting energy during the second time period in addition to the time period when RF energy is to be available.

12. The method of any of clauses 1-10, further comprising receiving a wake up indication indicating a second time period to monitor a control channel, wherein the second time period is within the time period when RF energy is to be available.

13. The method of any of clauses 1-12, further comprising receiving a configuration message indicating when the UE is to monitor for the energy harvesting indication signal.

14. The method of any of clauses 1-6, wherein the energy harvesting indication signal is a distinct sequence of a reference signal.

15. The method of clause 14, wherein the sequence of the reference signal is one of: a sequence indicating that the time period is for communication, a sequence indicating that the time period is for energy harvesting, or a sequence indicating that the time period is for both communication and energy harvesting.

16. A method of wireless communication, comprising:
transmitting, to a user equipment (UE), an energy harvesting indication signal that indicates a time period when radio frequency (RF) energy is to be available for energy harvesting; and
transmitting an RF signal to the UE or another UE during the time period.

17. The method of clause 16, wherein the energy harvesting indication signal indicates a start of the time period.

18. The method of clause 17, further comprising transmitting an indication of an end of the time period.

19. The method of any of clauses 16-18, wherein the energy harvesting indication signal indicates a duration of the time period.

20. The method of any of clauses 16-19, wherein the energy harvesting indication signal indicates a pattern of the RF energy within the time period.

21. The method of any of clauses 16-20, wherein there is a gap between a time when the energy harvesting indication signal is transmitted and a start of the time period.

22. The method of any of clauses 16-21, wherein the energy harvesting indication signal is included in a paging physical downlink control channel (PDCCH) within reserved bits or a short message field.

23. The method of any of clauses 16-21, wherein the energy harvesting indication signal is included in a connected mode wake up signal or an idle mode paging early indication signal.

24. The method of clause 23, wherein the connected mode wake up signal or the idle mode paging early indication signal includes a single bit indicating whether the time period is for communication, energy harvesting, or both.

25. The method of clause 23, wherein the connected mode wake up signal or the idle mode paging early indication signal includes a first bit indicating whether the time period is for communication for the UE and a second bit indicating whether the time period is for energy harvesting.

26. The method of any of clauses 16-25, further comprising transmitting a wake up indication indicating a second time period for the UE to monitor a control channel, wherein the UE is to harvest energy during the second time period in addition to the time period when RF energy is to be available.

27. The method of any of clauses 16-25, further comprising transmitting a wake up indication indicating a second time period for the UE to monitor a control channel, wherein the second time period is within the time period when RF energy is to be available.

28. The method of any of clauses 16-27, further comprising transmitting a configuration message indicating when the UE is to monitor for the energy harvesting indication signal.

29. The method of any of clauses 16-21, wherein the energy harvesting indication signal is a distinct sequence of a reference signal.

30. The method of clause 29, wherein the sequence of the reference signal is one of: a sequence indicating that the time period is for communication, a sequence indicating that the time period is for energy harvesting, or a sequence indicating that the time period is for both communication and energy harvesting.

31. An apparatus of a user equipment (UE), comprising:
a memory storing computer-executable instructions; and
at least one processor coupled with the memory and configured to execute the instructions to:
receive, from a second device, an energy harvesting indication signal that indicates a time period when an radio frequency (RF) signal is to be transmitted by the second device; and
harvest RF energy from the RF signal during the time period.

32. The apparatus of clause 31, wherein the energy harvesting indication signal indicates a start of the time period.

33. The apparatus of clause 32, wherein the at least one processor is configured to receive an indication of an end of the time period.

34. The apparatus of any of clauses 31-33, wherein the energy harvesting indication signal indicates a duration of the time period.

35. The apparatus of any of clauses 31-34, wherein the energy harvesting indication signal indicates a pattern of the RF energy within the time period.

36. The apparatus of any of clauses 31-35, wherein there is a gap between a time when the energy harvesting indication signal is received and a start of the time period.

37. The apparatus of any of clauses 31-36, wherein the energy harvesting indication signal is included in a paging physical downlink control channel (PDCCH) within reserved bits or a short message field.

38. The apparatus of any of clauses 31-36, wherein the energy harvesting indication signal is included in a connected mode wake up signal or an idle mode paging early indication signal.

39. The apparatus of clause 38, wherein the connected mode wake up signal or the idle mode paging early indication signal includes a single bit indicating whether the time period is for communication, energy harvesting, or both.

40. The apparatus of clause 38, wherein the connected mode wake up signal or the idle mode paging early indication signal includes a first bit indicating whether the time period is for communication and a second bit indicating whether the time period is for energy harvesting.

41. The apparatus of any of clauses 31-40, wherein the at least one processor is configured to:
receive a wake up indication indicating a second time period to monitor a control channel; and
harvest energy during the second time period in addition to the time period when RF energy is to be available.

42. The apparatus of any of clauses 31-40, wherein the at least one processor is configured to receive a wake up indication indicating a second time period to monitor a control channel, wherein the second time period is within the time period when RF energy is to be available.

43. The apparatus of any of clauses 31-42, wherein the at least one processor is configured to receive a configuration message indicating when the UE is to monitor for the energy harvesting indication signal.

44. The apparatus of any of clauses 31-36, wherein the energy harvesting indication signal is a distinct sequence of a reference signal.

45. The apparatus of clause 44, wherein the sequence of the reference signal is one of: a sequence indicating that the time period is for communication, a sequence indicating that the time period is for energy harvesting, or a sequence indicating that the time period is for both communication and energy harvesting.

46. An apparatus for wireless communication, comprising:
a memory storing computer-executable instructions; and
at least one processor coupled with the memory and configured to execute the instructions to:
transmit, to a user equipment (UE), an energy harvesting indication signal that indicates a time period when radio frequency (RF) energy is to be available for energy harvesting; and
transmit an RF signal to the UE or another UE during the time period.

47. The apparatus of clause 46, wherein the energy harvesting indication signal indicates a start of the time period.

48. The apparatus of clause 47, wherein the at least one processor is configured to transmit an indication of an end of the time period.

49. The apparatus of any of clauses 46-48, wherein the energy harvesting indication signal indicates a duration of the time period.

50. The apparatus of any of clauses 46-49, wherein the energy harvesting indication signal indicates a pattern of the RF energy within the time period.

51. The apparatus of any of clauses 46-50, wherein there is a gap between a time when the energy harvesting indication signal is transmitted and a start of the time period.

52. The apparatus of any of clauses 46-51, wherein the energy harvesting indication signal is included in a paging physical downlink control channel (PDCCH) within reserved bits or a short message field.

53. The apparatus of any of clauses 46-51, wherein the energy harvesting indication signal is included in a connected mode wake up signal or an idle mode paging early indication signal.

54. The apparatus of clause 53, wherein the connected mode wake up signal or the idle mode paging early indication signal includes a single bit indicating whether the time period is for communication, energy harvesting, or both.

55. The apparatus of clause 53, wherein the connected mode wake up signal or the idle mode paging early indication signal includes a first bit indicating whether the time period is for communication for the UE and a second bit indicating whether the time period is for energy harvesting.

56. The apparatus of any of clauses 46-55, wherein the at least one processor is configured to transmit a wake up indication indicating a second time period for the UE to monitor a control channel, wherein the UE is to harvest energy during the second time period in addition to the time period when RF energy is to be available.

57. The apparatus of any of clauses 46-55, wherein the at least one processor is configured to transmit a wake up indication indicating a second time period for the UE to monitor a control channel, wherein the second time period is within the time period when RF energy is to be available.

58. The apparatus of any of clauses 46-57, wherein the at least one processor is configured to transmit a configuration message indicating when the UE is to monitor for the energy harvesting indication signal.

59. The apparatus of any of clauses 46-51, wherein the energy harvesting indication signal is a distinct sequence of a reference signal.

60. The apparatus of clause 59, wherein the sequence of the reference signal is one of: a sequence indicating that the time period is for communication, a sequence indicating that the time period is for energy harvesting, or a sequence indicating that the time period is for both communication and energy harvesting.

61. An apparatus of a user equipment (UE), comprising:
means for receiving, from a second device, an energy harvesting indication signal that indicates a time period when an radio frequency (RF) signal is to be transmitted by the second device; and
means for harvesting RF energy from the RF signal during the time period.

62. The apparatus of clause 61, wherein the energy harvesting indication signal indicates a start of the time period.

63. The apparatus of clause 62, wherein the means for receiving is configured to receive an indication of an end of the time period.

64. The apparatus of any of clauses 61-63, wherein the energy harvesting indication signal indicates a duration of the time period.

65. The apparatus of any of clauses 61-64, wherein the energy harvesting indication signal indicates a pattern of the RF energy within the time period.

66. The apparatus of any of clauses 61-65, wherein there is a gap between a time when the energy harvesting indication signal is received and a start of the time period.

67. The apparatus of any of clauses 61-66, wherein the energy harvesting indication signal is included in a paging physical downlink control channel (PDCCH) within reserved bits or a short message field.

68. The apparatus of any of clauses 61-66, wherein the energy harvesting indication signal is included in a connected mode wake up signal or an idle mode paging early indication signal.

69. The apparatus of clause 68, wherein the connected mode wake up signal or the idle mode paging early indication signal includes a single bit indicating whether the time period is for communication, energy harvesting, or both.

70. The apparatus of clause 68, wherein the connected mode wake up signal or the idle mode paging early indication signal includes a first bit indicating whether the time period is for communication and a second bit indicating whether the time period is for energy harvesting.

71. The apparatus of any of clauses 61-70, wherein the means for receiving is configured to receive a wake up indication indicating a second time period to monitor a control channel, and wherein the means for harvesting energy is configured to harvest energy during the second time period in addition to the time period when RF energy is to be available.

72. The apparatus of any of clauses 61-70, wherein the means for receiving is configured to receive a wake up indication indicating a second time period to monitor a control channel, wherein the second time period is within the time period when RF energy is to be available.

73. The apparatus of any of clauses 61-72, wherein the means for receiving is configured to receive a configuration message indicating when the UE is to monitor for the energy harvesting indication signal.

74. The apparatus of any of clauses 61-66, wherein the energy harvesting indication signal is a distinct sequence of a reference signal.

75. The apparatus of clause 74, wherein the sequence of the reference signal is one of: a sequence indicating that the time period is for communication, a sequence indicating that the time period is for energy harvesting, or a sequence indicating that the time period is for both communication and energy harvesting.

76. An apparatus for wireless communication, comprising:
 means for transmitting, to a user equipment (UE), an energy harvesting indication signal that indicates a time period when radio frequency (RF) energy is to be available for energy harvesting; and
 means for transmitting an RF signal to the UE or another UE during the time period.

77. The apparatus of clause 76, wherein the energy harvesting indication signal indicates a start of the time period.

78. The apparatus of clause 77, further comprising means for transmitting an indication of an end of the time period.

79. The apparatus of any of clauses 76-78, wherein the energy harvesting indication signal indicates a duration of the time period.

80. The apparatus of any of clauses 76-79, wherein the energy harvesting indication signal indicates a pattern of the RF energy within the time period.

81. The apparatus of any of clauses 76-80, wherein there is a gap between a time when the energy harvesting indication signal is transmitted and a start of the time period.

82. The apparatus of any of clauses 76-81, wherein the energy harvesting indication signal is included in a paging physical downlink control channel (PDCCH) within reserved bits or a short message field.

83. The apparatus of any of clauses 76-81, wherein the energy harvesting indication signal is included in a connected mode wake up signal or an idle mode paging early indication signal.

84. The apparatus of clause 83, wherein the connected mode wake up signal or the idle mode paging early indication signal includes a single bit indicating whether the time period is for communication, energy harvesting, or both.

85. The apparatus of clause 83, wherein the connected mode wake up signal or the idle mode paging early indication signal includes a first bit indicating whether the time period is for communication for the UE and a second bit indicating whether the time period is for energy harvesting.

86. The apparatus of any of clauses 76-85, further comprising means for transmitting a wake up indication indicating a second time period for the UE to monitor a control channel, wherein the UE is to harvest energy during the second time period in addition to the time period when RF energy is to be available.

87. The apparatus of any of clauses 76-85, further comprising means for transmitting a wake up indication indicating a second time period for the UE to monitor a control channel, wherein the second time period is within the time period when RF energy is to be available.

88. The apparatus of any of clauses 76-87, further comprising means for transmitting a configuration message indicating when the UE is to monitor for the energy harvesting indication signal.

89. The apparatus of any of clauses 76-81, wherein the energy harvesting indication signal is a distinct sequence of a reference signal.

90. The apparatus of clause 89, wherein the sequence of the reference signal is one of: a sequence indicating that the time period is for communication, a sequence indicating that the time period is for energy harvesting, or a sequence indicating that the time period is for both communication and energy harvesting.

91. A non-transitory computer-readable medium storing computer executable code, the code when executed by a processor of a user equipment (UE) instructs the processor to:
 receive, from a second device, an energy harvesting indication signal that indicates a time period when an radio frequency (RF) signal is to be transmitted by the second device; and
 harvest RF energy from the RF signal during the time period.

92. The non-transitory computer-readable medium of clause 91, wherein the energy harvesting indication signal indicates a start of the time period.

93. The non-transitory computer-readable medium of clause 92, further comprising code to receive an indication of an end of the time period.

94. The non-transitory computer-readable medium of any of clauses 91-93, wherein the energy harvesting indication signal indicates a duration of the time period.

95. The non-transitory computer-readable medium of any of clauses 91-94, wherein the energy harvesting indication signal indicates a pattern of the RF energy within the time period.

96. The non-transitory computer-readable medium of any of clauses 91-95, wherein there is a gap between a time when the energy harvesting indication signal is received and a start of the time period.

97. The non-transitory computer-readable medium of any of clauses 91-96, wherein the energy harvesting indication signal is included in a paging physical downlink control channel (PDCCH) within reserved bits or a short message field.

98. The non-transitory computer-readable medium of any of clauses 91-96, wherein the energy harvesting indication signal is included in a connected mode wake up signal or an idle mode paging early indication signal.

99. The non-transitory computer-readable medium of clause 98, wherein the connected mode wake up signal or the idle mode paging early indication signal includes a single bit indicating whether the time period is for communication, energy harvesting, or both.

100. The non-transitory computer-readable medium of clause 98, wherein the connected mode wake up signal or the idle mode paging early indication signal includes a first bit indicating whether the time period is for communication and a second bit indicating whether the time period is for energy harvesting.

101. The non-transitory computer-readable medium of any of clauses 91-100, further comprising code to:
receive a wake up indication indicating a second time period to monitor a control channel; and
harvest energy during the second time period in addition to the time period when RF energy is to be available.

102. The non-transitory computer-readable medium of any of clauses 91-100, further comprising code to receive a wake up indication indicating a second time period to monitor a control channel, wherein the second time period is within the time period when RF energy is to be available.

103. The non-transitory computer-readable medium of any of clauses 91-102, further comprising code to receive a configuration message indicating when the UE is to monitor for the energy harvesting indication signal.

104. The non-transitory computer-readable medium of any of clauses 91-96, wherein the energy harvesting indication signal is a distinct sequence of a reference signal.

105. The non-transitory computer-readable medium of clause 104, wherein the sequence of the reference signal is one of: a sequence indicating that the time period is for communication, a sequence indicating that the time period is for energy harvesting, or a sequence indicating that the time period is for both communication and energy harvesting.

106. A non-transitory computer-readable medium storing computer executable code, the code when executed by a processor instructs the processor to:
transmit, to a user equipment (UE), an energy harvesting indication signal that indicates a time period when radio frequency (RF) energy is to be available for energy harvesting; and
transmit an RF signal to the UE or another UE during the time period.

107. The non-transitory computer-readable medium of clause 106, wherein the energy harvesting indication signal indicates a start of the time period.

108. The non-transitory computer-readable medium of clause 107, further comprising code to transmit an indication of an end of the time period.

109. The non-transitory computer-readable medium of any of clauses 106-108, wherein the energy harvesting indication signal indicates a duration of the time period.

110. The non-transitory computer-readable medium of any of clauses 106-109, wherein the energy harvesting indication signal indicates a pattern of the RF energy within the time period.

111. The non-transitory computer-readable medium of any of clauses 106-110, wherein there is a gap between a time when the energy harvesting indication signal is transmitted and a start of the time period.

112. The non-transitory computer-readable medium of any of clauses 106-111, wherein the energy harvesting indication signal is included in a paging physical downlink control channel (PDCCH) within reserved bits or a short message field.

113. The non-transitory computer-readable medium of any of clauses 106-111, wherein the energy harvesting indication signal is included in a connected mode wake up signal or an idle mode paging early indication signal.

114. The non-transitory computer-readable medium of clause 113, wherein the connected mode wake up signal or the idle mode paging early indication signal includes a single bit indicating whether the time period is for communication, energy harvesting, or both.

115. The non-transitory computer-readable medium of clause 113, wherein the connected mode wake up signal or the idle mode paging early indication signal includes a first bit indicating whether the time period is for communication for the UE and a second bit indicating whether the time period is for energy harvesting.

116. The non-transitory computer-readable medium of any of clauses 106-115, further comprising code to transmit a wake up indication indicating a second time period for the UE to monitor a control channel, wherein the UE is to harvest energy during the second time period in addition to the time period when RF energy is to be available.

117. The non-transitory computer-readable medium of any of clauses 106-115, further comprising code to transmit a wake up indication indicating a second time period for the UE to monitor a control channel, wherein the second time period is within the time period when RF energy is to be available.

118. The non-transitory computer-readable medium of any of clauses 106-111, further comprising code to transmit a configuration message indicating when the UE is to monitor for the energy harvesting indication signal.

119. The non-transitory computer-readable medium of clause 106, wherein the energy harvesting indication signal is a distinct sequence of a reference signal.

120. The non-transitory computer-readable medium of clause 119, wherein the sequence of the reference signal is one of: a sequence indicating that the time period is for communication, a sequence indicating that the time period is for energy harvesting, or a sequence indicating that the time period is for both communication and energy harvesting.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The invention claimed is:

1. An apparatus of a user equipment (UE), comprising:
a memory storing computer-executable instructions; and
at least one processor coupled with the memory and configured to execute the instructions to:
receive, from a second device, an energy harvesting indication that indicates a time period when an radio frequency (RF) signal is to be transmitted by the second device to the UE, wherein the energy harvesting indication is included in a paging physical downlink control channel (PDCCH), a connected mode wake up signal, or an idle mode paging early indication signal, wherein the connected mode wake up signal or the idle mode paging early indication signal includes a single bit indicating whether the time period is for communication, energy harvesting, or both; and
harvest RF energy from the RF signal during the time period.

2. The apparatus of claim 1, wherein the energy harvesting indication indicates a start of the time period.

3. The apparatus of claim 2, further wherein the at least one processor is configured to receive an indication of an end of the time period.

4. The apparatus of claim 1, wherein the energy harvesting indication indicates a duration of the time period.

5. The apparatus of claim 1, wherein the energy harvesting indication indicates a pattern of the RF energy within the time period.

6. The apparatus of claim 1, wherein there is a gap between a time when the energy harvesting indication is received and a start of the time period.

7. The apparatus of claim 1, wherein the energy harvesting indication is included in a paging PDCCH within reserved bits or a short message field.

8. The apparatus of claim 1, wherein the connected mode wake up signal or the idle mode paging early indication signal includes a first bit indicating whether the time period is for communication and a second bit indicating whether the time period is for energy harvesting.

9. The apparatus of claim 1, wherein the at least one processor is configured to:
receive a wake up indication indicating a second time period to monitor a control channel; and
harvest energy during the second time period in addition to the time period when RF energy is to be available.

10. The apparatus of claim 1, wherein the at least one processor is configured to receive a wake up indication indicating a second time period to monitor a control channel, wherein the second time period is within the time period when RF energy is to be available.

11. The apparatus of claim 1, wherein the at least one processor is configured to receive a configuration message indicating when the UE is to monitor for the energy harvesting indication.

12. The apparatus of claim 1, wherein the energy harvesting indication is a distinct sequence of a reference signal.

13. A method of wireless communication, comprising, by a user equipment (UE):
receiving, from a second device, an energy harvesting indication that indicates a time period when an radio frequency (RF) signal is to be transmitted by the second device to the UE, wherein the energy harvesting indication is included in a paging physical downlink control channel (PDCCH), a connected mode wake up signal, or an idle mode paging early indication signal, wherein the connected mode wake up signal or the idle mode paging early indication signal includes a single bit indicating whether the time period is for communication, energy harvesting, or both; and
harvesting RF energy from the RF signal during the time period.

14. An apparatus for wireless communication, comprising:
a memory storing computer-executable instructions; and
at least one processor coupled with the memory and configured to execute the instructions to:
transmit, to a user equipment (UE), an energy harvesting indication that indicates a time period when radio frequency (RF) energy is to be available for energy harvesting, wherein the energy harvesting indication is included in a paging physical downlink control channel (PDCCH), a connected mode wake up signal, or an idle mode paging early indication signal, wherein the connected mode wake up signal or the idle mode paging early indication signal includes a single bit indicating whether the time period is for communication, energy harvesting, or both; and
transmit an RF signal to the UE or another UE during the time period.

15. The apparatus of claim 14, wherein the energy harvesting indication indicates a start of the time period.

16. The apparatus of claim 15, further comprising transmitting an indication of an end of the time period.

17. The apparatus of claim 14, wherein the energy harvesting indication indicates a duration of the time period.

18. The apparatus of claim 14, wherein the energy harvesting indication indicates a pattern of the RF energy within the time period.

19. The apparatus of claim 14, wherein there is a gap between a time when the energy harvesting indication is transmitted and a start of the time period.

20. The apparatus of claim 14, wherein the energy harvesting indication is included in a paging PDCCH within reserved bits or a short message field.

21. The apparatus of claim 14, wherein the connected mode wake up signal or the idle mode paging early indication signal includes a first bit indicating whether the time period is for communication for the UE and a second bit indicating whether the time period is for energy harvesting.

22. The apparatus of claim 14, wherein the at least one processor is configured to transmit a wake up indication indicating a second time period for the UE to monitor a control channel, wherein the UE is to harvest energy during the second time period in addition to the time period when RF energy is to be available.

23. The apparatus of claim 14, wherein the at least one processor is configured to transmit a wake up indication indicating a second time period for the UE to monitor a control channel, wherein the second time period is within the time period when RF energy is to be available.

24. The apparatus of claim 14, wherein the at least one processor is configured to transmit a configuration message indicating when the UE is to monitor for the energy harvesting indication.

25. The apparatus of claim 14, wherein the energy harvesting indication is a distinct sequence of a reference signal, wherein the sequence of the reference signal is one of: a sequence indicating that the time period is for communication, a sequence indicating that the time period is for energy harvesting, or a sequence indicating that the time period is for both communication and energy harvesting.

26. A method of wireless communication, comprising:
  transmitting, to a user equipment (UE), an energy harvesting indication that indicates a time period when radio frequency (RF) energy is to be available for energy harvesting, wherein the energy harvesting indication is included in a paging physical downlink control channel (PDCCH), a connected mode wake up signal, or an idle mode paging early indication signal, wherein the connected mode wake up signal or the idle mode paging early indication signal includes a single bit indicating whether the time period is for communication, energy harvesting, or both; and
  transmitting an RF signal to the UE or another UE during the time period.

* * * * *